(12) United States Patent
Lin et al.

(10) Patent No.: US 10,667,585 B2
(45) Date of Patent: Jun. 2, 2020

(54) ELECTRONIC BEAD STRING AND COUNTING METHOD THEREOF

(71) Applicants: Inventec (Pudong) Technology Corporation, Shanghai (CN); INVENTEC CORPORATION, Taipei (TW)

(72) Inventors: Chun-Chi Lin, Taipei (TW); Chia-Cheng Shih, Taipei (TW); Wen-Huang Lee, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 212 days.

(21) Appl. No.: 15/847,870

(22) Filed: Dec. 19, 2017

(65) Prior Publication Data
US 2019/0029375 A1    Jan. 31, 2019

(30) Foreign Application Priority Data

Jul. 26, 2017    (CN) .......................... 2017 1 0618865

(51) Int. Cl.
| | |
|---|---|
| *A44C 23/00* | (2006.01) |
| *G06M 1/276* | (2006.01) |
| *G01C 19/00* | (2013.01) |
| *G06M 3/06* | (2006.01) |
| *G06C 7/00* | (2006.01) |
| *G06C 1/00* | (2006.01) |

(52) U.S. Cl.
CPC ............. *A44C 23/00* (2013.01); *G01C 19/00* (2013.01); *G06C 1/00* (2013.01); *G06C 7/00* (2013.01); *G06M 1/276* (2013.01); *G06M 3/06* (2013.01)

(58) Field of Classification Search
CPC ..................................................... A44C 23/00
See application file for complete search history.

(56) References Cited

U.S. PATENT DOCUMENTS

2016/0080855 A1*    3/2016    Greenberg ........... H04R 1/1066
                                                            381/74

OTHER PUBLICATIONS

Chen et al., CN 106874994 (machine translated version) (2017).*
Shen, CN-204273452 (machine translated version) (2015).*
Lin, CN-204796905 (machine translated version) (2015).*
Lau, HK-1191793 (machine translated version) (2014).*
Maeda, JP-3191793 (machine translated version) (2014).*
Shi, TW-368059 (machine translated version) (2009).*
Lau, TW-542297(machine translated version) (2016).*

* cited by examiner

*Primary Examiner* — Hyun D Park
(74) *Attorney, Agent, or Firm* — CKC & Partners Co., LLC

(57) ABSTRACT

An electronic bead string includes a main bead, a plurality of secondary beads, a displacement sensor, a memory, and a processor. The main bead and the secondary beads are strung together to form a bead string. The displacement sensor is fixed in the main bead to output two-dimensional displacement signals, the memory stores the two-dimensional displacement signals, and the processor determines whether a rotation cycle of the electronic bead string is an approved rotation cycle according to the two-dimensional displacement signals.

8 Claims, 8 Drawing Sheets

ELECTRONIC BEAD STRING AND COUNTING METHOD THEREOF

RELATED APPLICATIONS

This application claims priority to Chinese Application Serial Number 201710618865.8, filed on Jul. 26, 2017, which is herein incorporated by reference.

TECHNICAL FIELD

The present disclosure generally relates to a bead string and a counting method thereof. More particularly, the present disclosure relates to an electronic bead string and a counting method thereof.

BACKGROUND

Wearable devices are now widely used in modern life. The wearable devices generally can be divided into the following types, e.g. glasses, hand ring, glove and paste type etc., depending on the function and scope thereof. In addition, the wearable devices are become more diverse, and rapidly developed in the industry, education, medical and other fields.

For example, the smart bracelets can show the information and record personal sports or sleep data. Therefore, the current sales amount and the use population of the smart bracelets occupy a great amount of the wearable device.

However, with some special demands, the traditional wearable device cannot satisfy people's needs. For example, the Buddhist uses the Buddha beads to count the number of times to read Buddha. After the Buddhist reads the name of Buddha a lot of times, the Buddhist may not remember how many times the name of Buddha has been read.

Some of the users may use the electronic counter to count the number of times reading the Buddha. But some of the users may focus on reading the Buddha so as to forget to press the counter. Otherwise, some of the users have to be distracted their attention to press the counter so that they cannot concentrate on reading the Buddha.

There is a need to provide an electronic bead string, in order to facilitate and effectively calculate the number of reading the Buddha by users, so that the user can enhance his attention on reading the Buddha and avoid distracting his attention.

SUMMARY

One objective of the embodiments of the present invention is to provide an electronic bead string which allows a user to focus on reading the Buddha to perform the practice more intensely.

To achieve these and other advantages and in accordance with the objective of the embodiments of the present invention, as the embodiment broadly describes herein, the embodiments of the present invention provides an electronic bead string including a main bead, a plurality of secondary beads, a displacement sensor, a memory and a processor. The secondary beads and the main bead are strung together to form a bead string, for example, Buddha bead string. The displacement sensor is disposed in the main bead to output two-dimensional displacement signals. The memory stores the two-dimensional displacement signals outputted by the displacement sensor. The processor can determine whether rotation cycles of the electronic bead string are approved rotation cycles according to the two-dimensional displacement signals.

In one embodiment, the main bead further includes a signal transmitting device to communicate with a computer device, e.g. a mobile phone.

In one embodiment, the signal transmitting device is a bluetooth transmitter, a WIFI transmitter or a wire signal transmitter.

In one embodiment, the memory further stores a minimum start period, a minimum recognition period and a rest time to compare with the two-dimensional displacement signals for determining the approved rotation cycles.

In one embodiment, the processor further determines the number of times of reading the Buddha by a user according to the approved rotation cycles and the number of the secondary beads.

In another aspect, the present invention provides an electronic bead string counting method including the following steps: providing an electronic bead string, wherein the electronic bead string comprises a main bead and a plurality of secondary beads; outputting two-dimensional displacement signals by a displacement sensor; utilizing a processor to determine whether continuous rotation cycles of the electronic bead string are longer than a minimum start period; utilizing the processor to accumulate approved rotation cycles of the electronic bead string; and utilizing the processor to calculate the number of times of reading the Buddha by a user.

In one embodiment, the electronic bead string counting method further includes a step of utilizing the processor to determine whether a pause time of the electronic bead string is longer than a rest time.

In one embodiment, the electronic bead string counting method further includes a step of utilizing the processor to determine whether rotation cycles of the electronic bead string after the pause time of the electronic bead string is longer than a minimum recognition period.

In one embodiment, the processor continuously accumulates the approved rotation cycles of the electronic bead string when the pause time is shorter than the rest time and the rotation cycles of the electronic bead string after the pause time of the electronic bead string is longer than the minimum recognition period.

In one embodiment, the electronic bead string counting method further includes a step of utilizing a signal transmitting device to transmit rotation data of the electronic bead string to a computer device.

Accordingly, the electronic bead string of the present invention can allow a user to count the number of times of reading the Buddha without touching any buttons while reading the Buddha. Although, when the user is significantly moving, e.g. walking or shaking hands, the electronic bead string can accurately count the number of times of reading the Buddha. Therefore, the electronic bead string of the present invention can allow the user intuitively reading the Buddha, and the number of times of reading the Buddha can be accurately counted by the electronic bead string so that the user can focus on his practice.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present disclosure. This description is not to be taken in a limiting sense but is made merely for the purpose of describing the general principles of the invention. The scope of the invention should be determined by referencing the appended claims.

The present invention discloses an electronic bead string 100 to allow a user intuitively reading the Buddha, that is, for example, repetitions of the name of Amitabha. The number of times of reading the Buddha can be determined by the electronic bead string 100 using a counting program therein, without manually counting, so that the user can be more focused on the practice. The electronic bead string 100 can be one hand ring, a chain or any bead string with a main bead 110 and secondary beads 120 connected in series, without departing from the spirit and scope of the invention.

Figure 1:
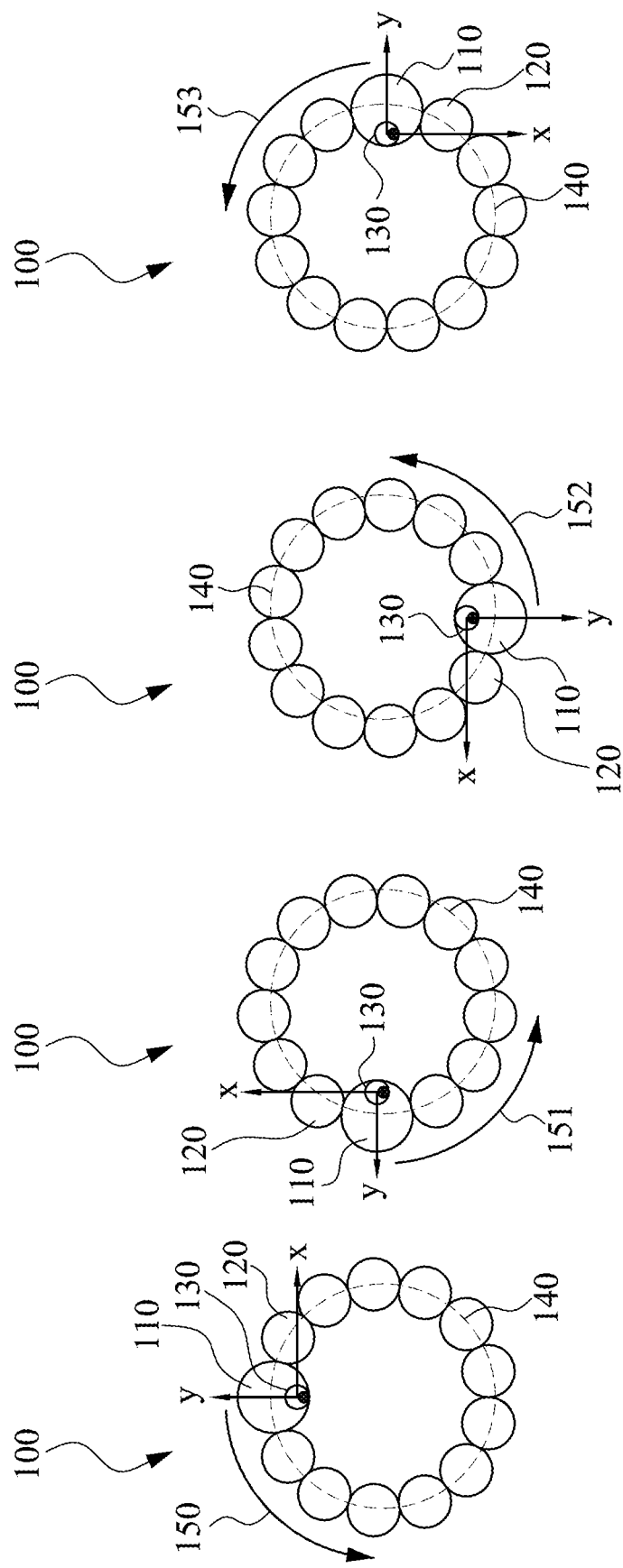
FIG. 1 illustrates a schematic diagram showing rotational statuses of an electronic bead string according to one embodiment of the present invention.

Referring to FIG. 1, a schematic diagram illustrates rotational statuses of an electronic bead string according to one embodiment of the present invention. The electronic bead string 100 includes at least one main bead 110, a plurality of secondary beads 120 and a displacement sensor 130. The main bead 110 and the secondary beads 120 can be strung by a bead string wire 140 to form a bead string. The main bead 110 and the secondary beads 120 can be connected together by hooks or the like without departing from the spirit and scope of the invention. The displacement sensor 130 is disposed in the main bead 110 to output two-dimensional displacement signals.

Figure 2:
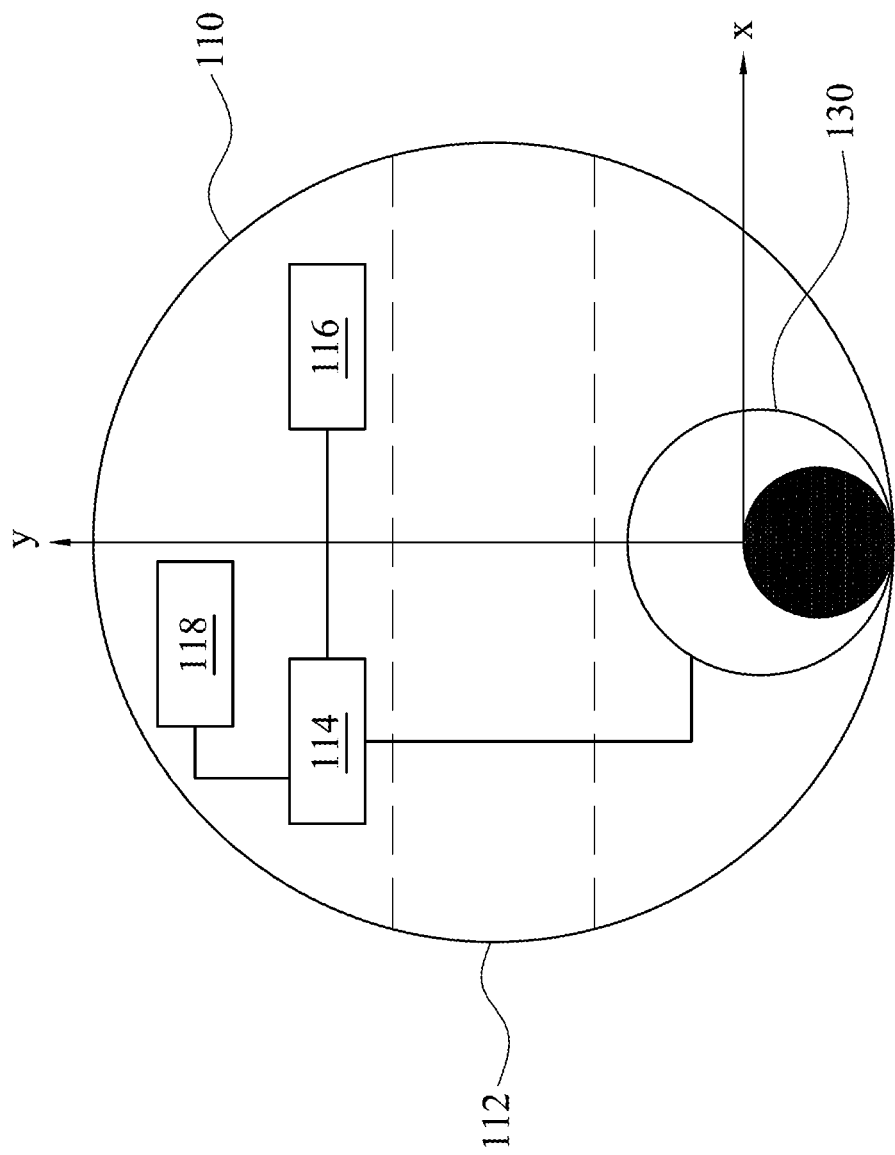
FIG. 2 illustrates a schematic diagram showing a main bead of an electronic bead string according to one embodiment of the present invention.

Further referring to FIG. 2, a schematic diagram illustrates a main bead of an electronic bead string according to one embodiment of the present invention. The main bead 110 includes a bead through hole 112, and the displacement sensor 130 is disposed at one side of the bead through hole 112. In addition, the main bead 110 further includes a processor 114, a memory 116 and a signal transmitting device 118.

The counting method of the electronic bead string 100 is based on a displacement variation of the displacement sensor 130. The displacement sensor 130 is, for example, a G-sensor, a Gyro-meter, a motion-sensor or the like. The signal transmitting device 118 is, for example, a bluetooth dongle, a WIFI transmitter, a wire signal transmitter or the like without departing from the spirit and scope of the invention.

When the electronic bead string 100 is used, a user can rotate the electronic bead string 100 according to a religion requirement. For example, the user can rotate the electronic bead string 100 starting from the main bead 110 and continuously rotate the electronic bead string 100 one time one bead while reading the Buddha. Until the electronic bead string 100 is rotated one cycle, that is to say, meeting the main bead 110 again, the electronic bead string 100 is reversely rotated.

In one embodiment, referring to FIG. 1 again, the user may also rotate the electronic bead string 100 in the same direction as the arrow directions 150, 151, 152 and 153. The main bead 110 will change the position and the angle thereof due to the rotation of the electronic bead string 100, thus causing the displacement sensor 130 to output different displacement signals.

Figure 3:
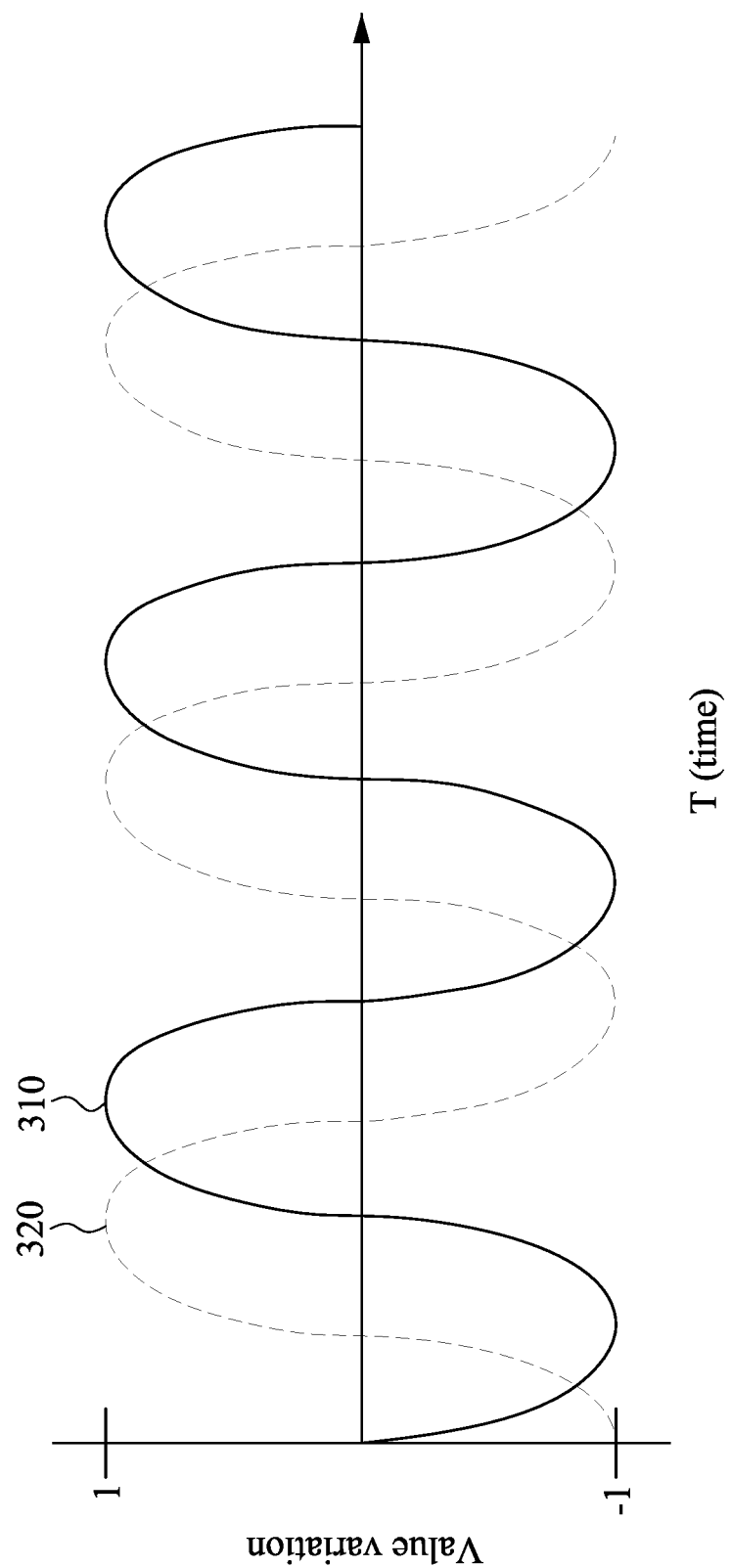
FIG. 3 illustrates a schematic diagram showing output signals of a displacement sensor while rotating the electronic bead string according to one embodiment of the present invention.

Simultaneously referring to FIG. 3, a schematic diagram illustrates output signals of the displacement sensor while rotating the electronic bead string in accordance with FIG. 1. The displacement sensor 130 outputs the output signals according to the position variation of the displacement sensor 130 in the XY coordinate as the X-value variation curve 310 and the Y-value variation curve 320. Both of the X-value variation curve 310 and the Y-value variation curve 320 are wave curves as shown in FIG. 3. In one embodiment, for example, the X-value variation curve 310 and the Y-value variation curve 320 have a 90 degree phase difference therebetween.

After continuous rotation cycles, the electronic bead string 100 can easily calculate the number of times of the rotation cycles thereof, and then multiply the number of times of the rotation cycles by the main bead 110 plus the number of secondary beads 120, the number of times of reading the Buddha by a user can be calculated.

In an embodiment, the number of the electronic bead string 100 is 16, that is, a main bead 110 plus 15 secondary beads 120. When the user rotates the electronic bead string 100 about 28 cycles and the main bead 110 stops at position (X:Y=0.5:−0.5), then the electronic bead string 100 can be determined to stop at the position of about 15th bead, and the result will be 16×28+15=463 times, that is, the user has read the Buddha about 463 times.

However, in another embodiment, if the main bead 110 is not counted, the number of the main bead 110 in each cycle may be subtracted, and the result will be 463−28=435 times, that is, the user has read the Buddha about 435 times.

Figure 4:
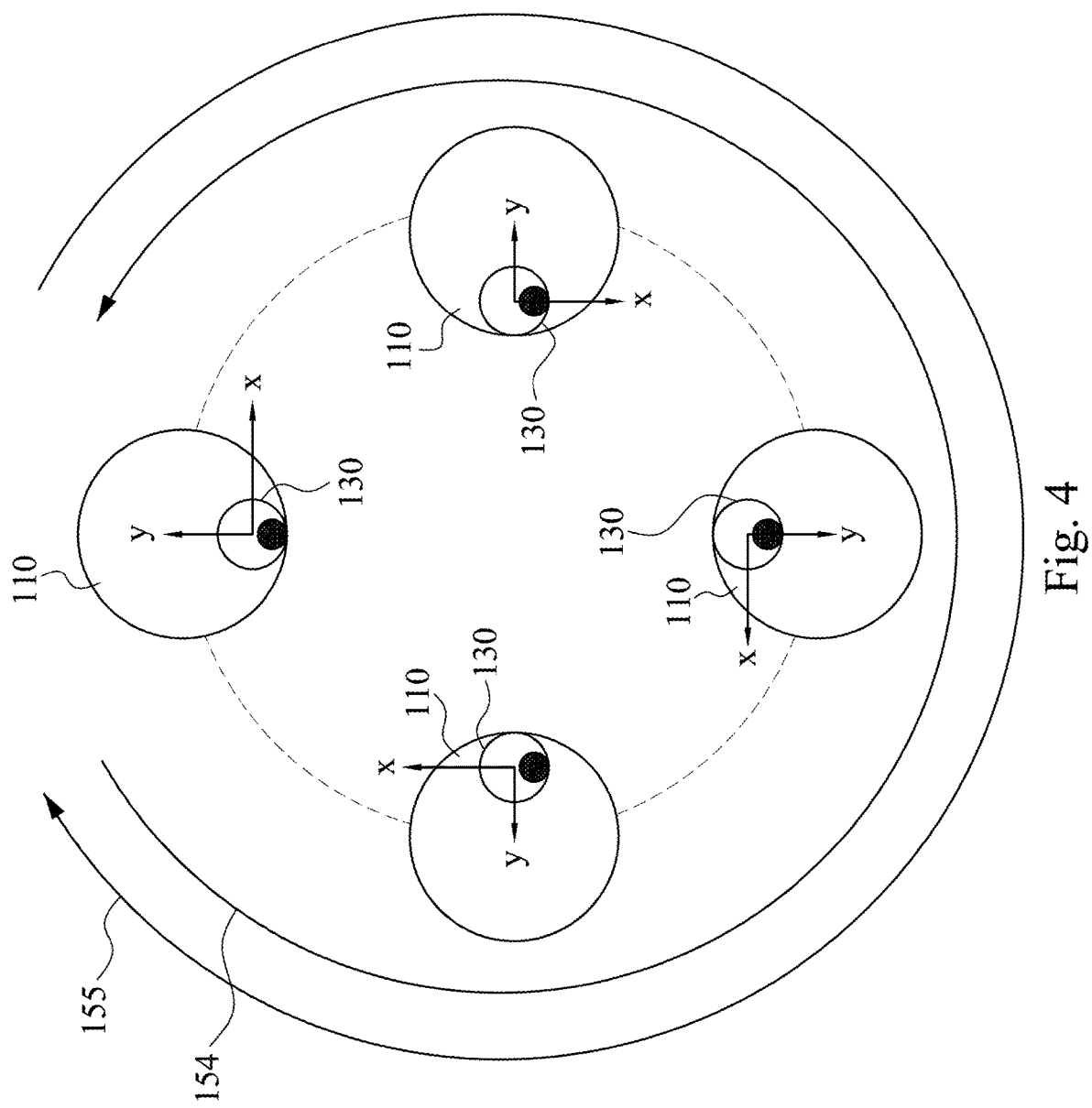
FIG. 4 illustrates a schematic diagram showing an electronic bead string according to one embodiment of the present invention while reversely rotating.
Figure 5:
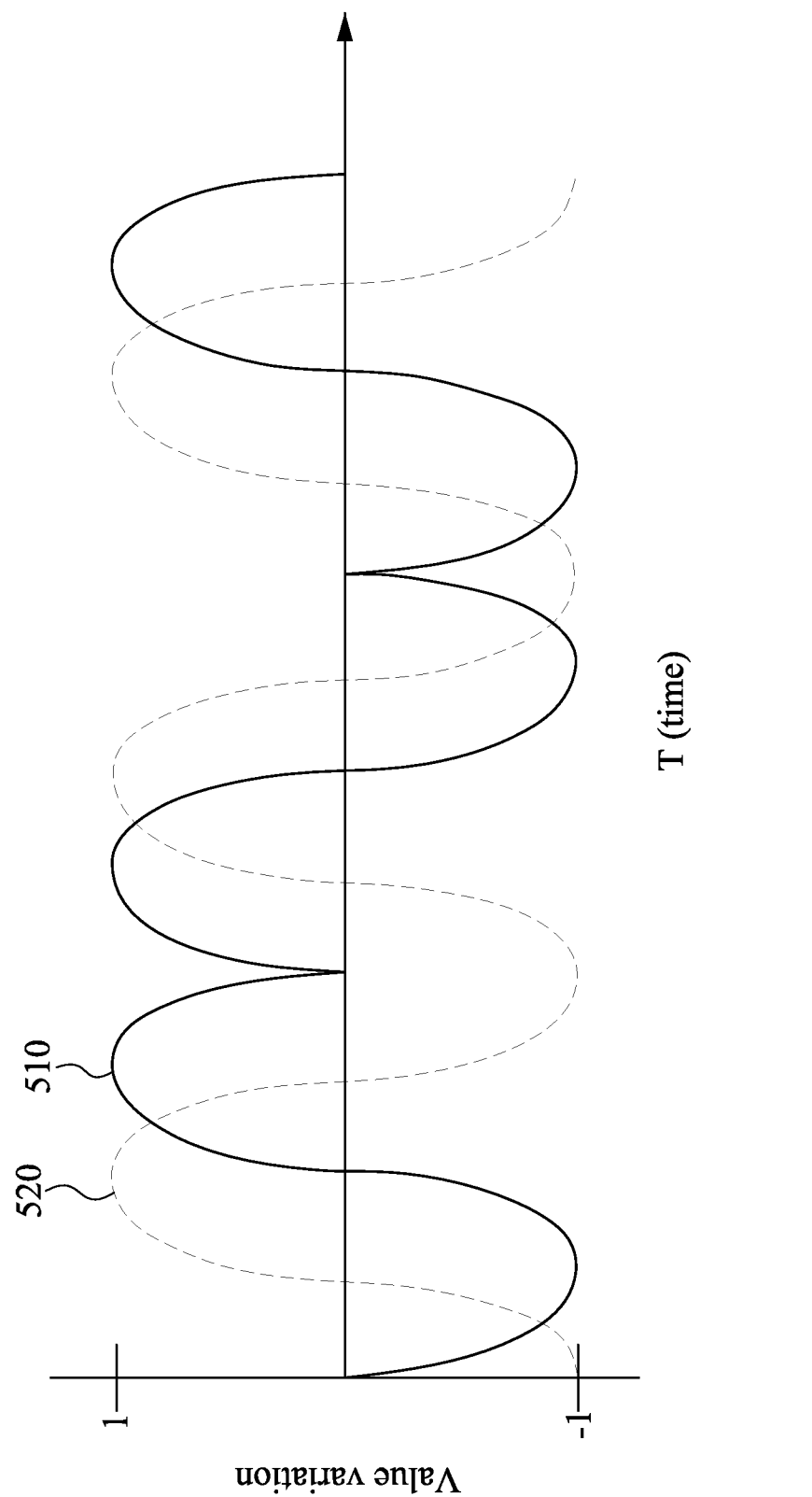
FIG. 5 illustrates a schematic diagram showing output signals of the displacement sensor while rotating the electronic bead string of FIG. 4.

Further referring to FIGS. 4 and 5, FIG. 4 is a schematic view showing an electronic bead string according to one embodiment of the present invention while reversely rotating. FIG. 5 is a schematic diagram showing output signals of the displacement sensor while rotating the electronic bead string as illustrated in FIG. 4.

As shown in FIGS. 4 and 5, some users will rotate the electronic bead string 100 until their finger touch the main bead 110 of the electronic bead string 100, and then reversely rotate the electronic bead string 100, that is, the electronic bead string 100 is first rotated in the arrow direction 154 about 360 degrees and then reversely rotated about 360 degrees in the arrow direction 155 about 360 degrees, and then further rotated in a reverse direction. The Y-value variation curve 520 may still show a wave curve, and the X-value variation curve 510 will show phase shifts in the wave curves.

Although the X-value variation curve 510 is significantly different from the Y-value variation curve 520 while reversely rotating the electronic bead string 100. However, the X-value variation curve 510 and the Y-value variation curve 520 are both recurrently changed, and therefore, the electronic bead string 100 of the present invention can still deal with as an active and normal action of the user, so that the number of times of reading the Buddha by the user can be accurately calculated.

In one embodiment, the electronic bead string 100 may instantaneously, periodically or according to a request of the user, transmit the data stored in the memory 116 and/or the data calculated by the processor 114 to synchronize with a computer device and display relevant information to the user. For example, the electronic bead string 100 can be connected with a mobile phone app for simultaneous transmitting and displaying the information.

In one embodiment, at least a part of the functionality of the processor 114 can be accomplished by a processor in the mobile phone without departing from the spirit and scope of the present invention.

Figure 6:
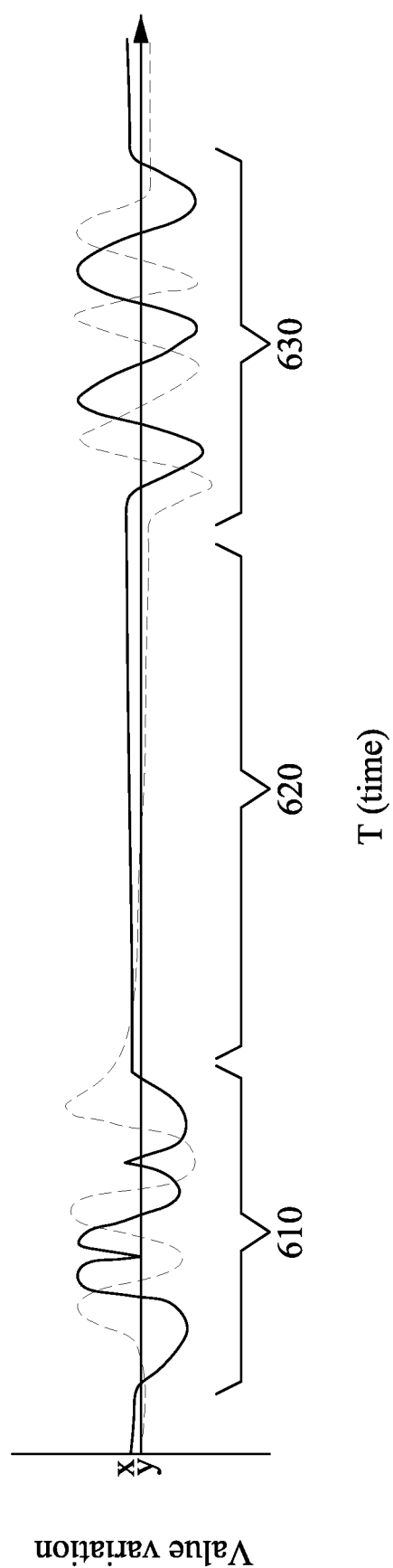
FIG. 6 illustrates a schematic diagram showing one output signal record of the displacement sensor while rotating the electronic bead string according to one embodiment of the present invention.

Referring to FIG. 6, a schematic diagram showing one output signal record of the displacement sensor while rotating the electronic bead string according to one embodiment of the present invention is illustrated. The electronic bead string 100 can effectively avoid abnormally counting the rotation cycles because of walking or sports of the user, the electronic bead string 100 can set more parameters to avoid abnormally counting the number of times of reading the Buddha.

In one embodiment, the parameters of the electronic bead string 100 includes a minimum start period, i.e. when the user rotates the electronic bead string 100 beyond the minimum start period, the rotation cycles of the electronic bead string 100 can be calculated as approved rotation cycles. This minimum start period is a short period to allow the electronic bead string 100 to start counting the rotation cycle of the electronic bead string 100.

In one embodiment, the parameters of the electronic bead string 100 include a rest time, when the user stops rotating the electronic bead string 100 after a predetermined time, the electronic bead string 100 has to be re-sensed to a new rotation cycle that exceeds the minimum start period and then the new rotation cycles can be approved by the processor 114 to be approved rotation cycles. If the user stops rotating the electronic bead string 100 less than the rest time, the following rotation cycles of the electronic bead string 100 can be approved by the processor 114 rather than re-sensed to a new rotation cycle.

In one embodiment, the parameters of the electronic bead string 100 further includes a minimum recognition period, in order to avoid counting abnormal rotation cycle of the electronic bead string 100 after the user triggers the electronic bead string 100. For example, the abnormal rotation cycle of the electronic bead string 100 can be caused by swimming hands, rope skipping or walking, etc. The electronic bead string 100 can be set that only the rotation cycle longer than the minimum recognition period may be considered to be approved rotation cycles.

In an embodiment, the pause time that the user pauses the rotation of the electronic bead string 100 is shorter than the rest time, the X-value variation curve of the electronic bead string 100 and the Y-value variation curve have to achieve the minimum recognition period, the electronic bead string 100 can continue to count the rotation cycles, and accumulate the rotation cycles as the approved rotation cycles. However, if the X-value variation curve and the Y-value variation curve do not reach the minimum recognition period, the electronic bead string 100 will not count the rotation cycles as the approved rotation cycles.

In one embodiment, the parameters of the electronic bead string 100 also includes the number of beads.

Referring to FIG. 6, when the minimum start period is set to 3 cycles, the electronic bead string 100 has a main bead 110 and 15 secondary beads 120, the rest time is set to 10 seconds, and the minimum recognition period is set to more than 1 cycle. The first rotation cycle 610 is only 2.5 cycles, the pause time 620 is about 8 seconds, and the second rotation cycle 630 is about 3 cycles. The first rotation cycle 610 and the second rotation cycle 630 are both longer than the minimum recognition period, and the pause time 620 is shorter than the rest time so that the first rotation cycle 610 and the second rotation cycle 630 can be counted as a continuous behavior, the electronic bead string 100 can recognize the approved rotation cycles about 5.5 cycles and multiply 16 beads, that is, about 88 times repetitions of reading the Buddha.

In an embodiment, since the electronic bead string 100 of the present invention can also be used in a situation where only touching the secondary beads 120 to read the Buddha rather than the main bead 110. Therefore, if the electronic bead string 100 is rotated in this situation, the number of the main bead 110 has to be deducted, that is, 88−5=83 times, without departing from the spirit and the scope of the present invention.

In another embodiment, when the minimum start period is set to 3 cycles, the electronic bead string 100 has a main bead 110 and 15 secondary beads 120, the rest time is set to 10 seconds, and the minimum recognition period is set to more than 1 cycle. The number of cycles of the first rotation cycle 610 is only 2.5 cycles, the pause time 620 is about 12 seconds, and the second rotation cycle 630 is about 3 cycles. At the moment, the first rotation cycle 610 and the second rotation cycle 630 are both longer than the minimum recognition period, but the pause time 620 is longer than the rest time, so the first rotation cycle 610 is not considered as approved rotation cycles, only the second rotation cycle 630 can be considered as approved rotation cycles. Therefore, only 3 cycles are approved rotation cycles, and the electronic bead string 100 has 3 approved rotation cycles and multiplied by 16 beads, that is, 48 times repetitions of reading the Buddha.

In another embodiment, since the electronic bead string 100 of the present invention can also be used in the situation where only touching the secondary beads 120 to read the Buddha rather than the main bead 110. In this situation, the number of the main bead 110 has to be deducted, that is, 48−3=45 times of reading the Buddha, without departing from the spirit and scope of the invention.

Figure 7:
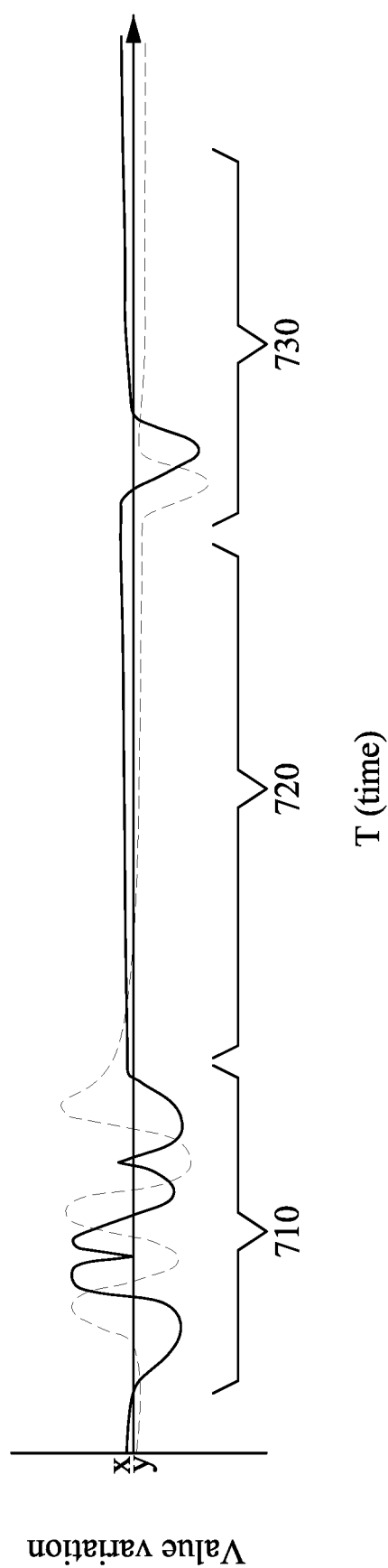
FIG. 7 illustrates a schematic diagram showing another output signal record of the displacement sensor while rotating the electronic bead string according to one embodiment of the present invention.

Referring to FIG. 7, a schematic diagram showing another output signal record of the displacement sensor while rotating the electronic bead string according to one embodiment of the present invention is illustrated. When the minimum start period is set to 3 cycles, the electronic bead string 100 has a main bead 110 and 15 secondary beads 120, the rest time is set to 10 seconds, and the minimum recognition period is set to more than 1 cycle. The first rotation cycle 710 is about 2.5 cycles, the pause time 720 is about 8 seconds, and the second rotation cycle 730 is only 0.5 cycles. Since the first rotation cycle 710 is greater than the minimum recognition period, the second rotation cycle 730 has only 0.5 cycles and does not reach the minimum recognition period, the electronic bead string 100 cannot reach the minimum start period and cannot add into the approved rotation cycles.

The electronic bead string 100 of the present invention can effectively calculate the number of times of reading the Buddha by the user with different rotation directions of the electronic bead string 100, and the electronic bead string 100 can effectively avoid counting the abnormal rotation cycles of the electronic bead string 100 caused by the unexpected movement to effectively increase the accuracy of reading the Buddha. Therefore, the user can focus on reading the Buddha without distraction.

Figure 8:
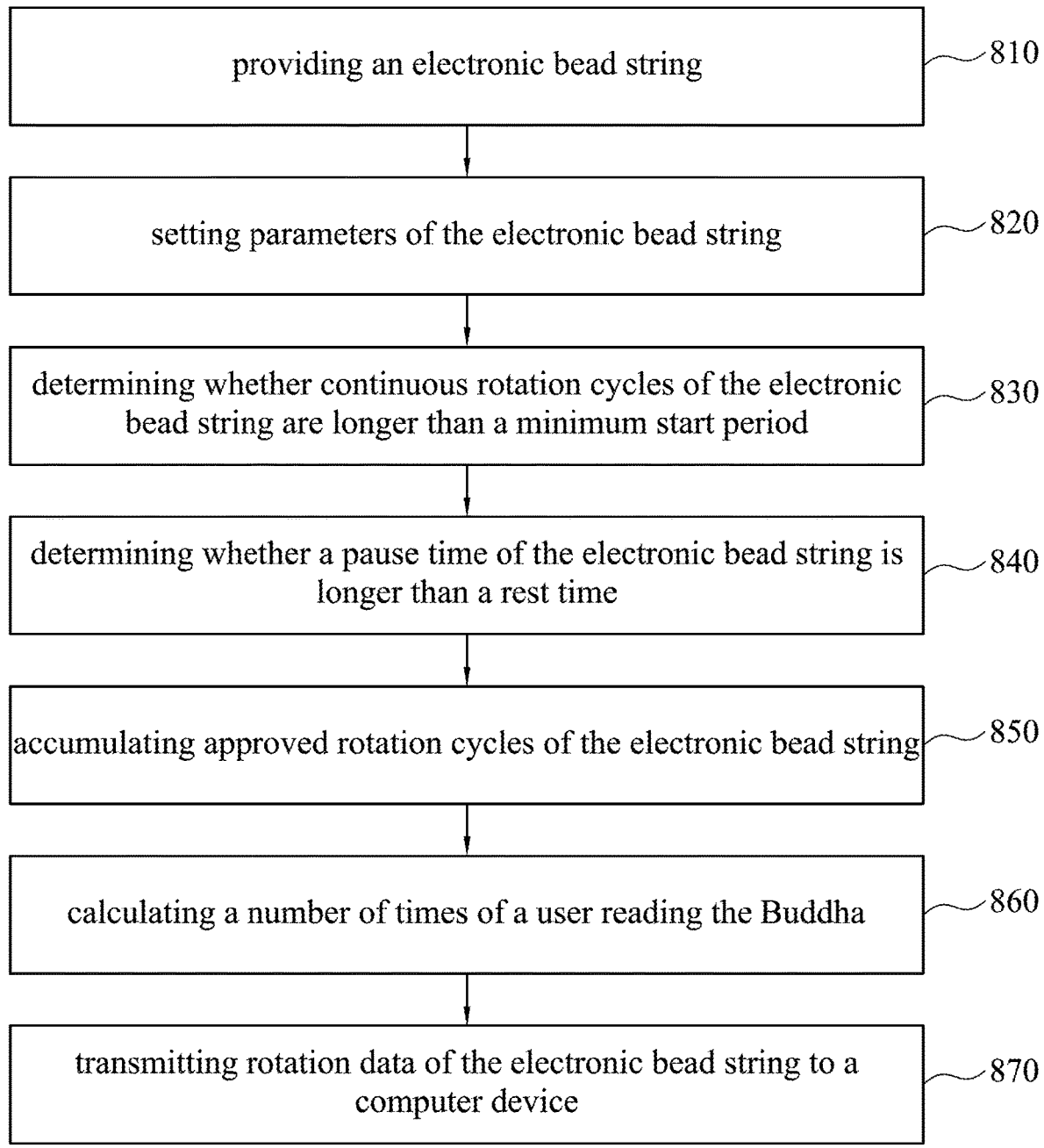
FIG. 8 illustrates a schematic flowing diagram of an electronic bead string counting method according to one embodiment of the present invention.

Referring to FIG. 8, a schematic flowing diagram of an electronic bead string counting method according to one embodiment of the present invention is illustrated. The electronic bead string counting method includes the following steps. First, in step 810, an electronic bead string 100 is provided. Next, in step 820, the parameters of the electronic bead string 100, for example, a minimum start period, a minimum recognition period, a rest time, and/or bead quantities, are determined. The parameters of the electronic bead string 100 can be set by connecting to a mobile phone APP through the signal transmitting device 118 or by way of pressing the key on the electronic bead string 100, without departing from the spirit and scope of the present invention.

Next, in step 830, the processor 114 calculates the period of the continuous rotation cycles of the electronic bead string 100 and further determines whether the continuous rotation cycles is longer than the minimum recognition period and the minimum start period. The electronic bead string 100 can also connect to the mobile phone APP and then the data is calculated by the processor of the mobile phone without departing from the spirit and scope of the present invention. Subsequently, in Step 840, the processor 114 further determines whether the pause time is longer than the pause time.

In Step 850, the processor 114 further accumulates the recognized rotation cycles of the electronic bead string 100, and then step 860, the processor 114 further calculates the number of times of reading the Buddha by the user. In Step 870, the signal transmitting device 118 transmits the rotation data of the electronic bead string 100 to a mobile phone.

The electronic bead string of the present invention can allow the user to count the number of times of reading the Buddha without touching any buttons while reading the Buddha. Although, when the user is significantly moving, e.g. walking or shaking hands, the electronic bead string 100 can accurately count the number of times of reading the Buddha. Therefore, the electronic bead string of the present invention can allow the user intuitively reading the Buddha, and the number of times of reading the Buddha can be accurately counted by the electronic bead string 100, so that users can be more focused on the practice.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. An electronic bead string, comprising:
a main bead;
a plurality of secondary beads, wherein the secondary beads and the main bead are strung together to form a bead string;
a displacement sensor disposed in the main bead to output two-dimensional displacement signals;
a memory storing the two-dimensional displacement signals outputted by the displacement sensor; and
a processor determining whether rotation cycles of the electronic bead string are approved rotation cycles according to the two-dimensional displacement signals, wherein the memory further stores a minimum start period, a minimum recognition period and a rest time to compare with the two-dimensional displacement signals for determining the approved rotation cycles, wherein the processor further determines the number of times of reading the name of the Buddha by a user according to the approved rotation cycles and the number of the secondary beads.

2. The electronic bead string of claim 1, wherein the main bead further comprises a signal transmitting device to communicate with a computer device.

3. The electronic bead string of claim 2, wherein the signal transmitting device is a bluetooth transmitter, a WIFI transmitter or a wire signal transmitter.

4. An electronic bead string counting method, comprising:
providing an electronic bead string, wherein the electronic bead string comprises a main bead and a plurality of secondary beads;
outputting two-dimensional displacement signals by a displacement sensor;
utilizing a processor to determine whether continuous rotation cycles of the electronic bead string are longer than a minimum start period;
utilizing the processor to accumulate approved rotation cycles of the electronic bead string; and
utilizing the processor to calculate the number of times of reading the name of the Buddha by a user.

5. The electronic bead string counting method of claim 4, further comprising a step of utilizing the processor to determine whether a pause time of the electronic bead string is longer than a rest time.

6. The electronic bead string counting method of claim 5, further comprising a step of utilizing the processor to determine whether rotation cycles of the electronic bead string after the pause time of the electronic bead string is longer than a minimum recognition period.

7. The electronic bead string counting method of claim 6, wherein the processor continuously accumulates the approved rotation cycles of the electronic bead string when the pause time is shorter than the rest time and the rotation cycles of the electronic bead string after the pause time of the electronic bead string is longer than the minimum recognition period.

8. The electronic bead string counting method of claim 7, further comprising a step of utilizing a signal transmitting device to transmit rotation data of the electronic bead string to a computer device.

\* \* \* \* \*